United States Patent
Liu et al.

(10) Patent No.: US 12,213,143 B2
(45) Date of Patent: Jan. 28, 2025

(54) DATA TRANSMISSION METHOD AND DEVICE AND RESOURCE DETERMINATION METHOD AND DEVICE

(71) Applicant: ZTE Corporation, Shenzhen (CN)

(72) Inventors: Kun Liu, Shenzhen (CN); Bo Dai, Shenzhen (CN); Xiubin Sha, Shenzhen (CN); Huiying Fang, Shenzhen (CN); Weiwei Yang, Shenzhen (CN); Luanjian Bian, Shenzhen (CN); Youjun Hu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 637 days.

(21) Appl. No.: 17/267,122

(22) PCT Filed: Aug. 9, 2019

(86) PCT No.: PCT/CN2019/100024
§ 371 (c)(1),
(2) Date: Feb. 9, 2021

(87) PCT Pub. No.: WO2020/030126
PCT Pub. Date: Feb. 13, 2020

(65) Prior Publication Data
US 2021/0314926 A1    Oct. 7, 2021

(30) Foreign Application Priority Data
Aug. 9, 2018   (CN) .......................... 201810905138.4

(51) Int. Cl.
*H04W 72/044*    (2023.01)
*H04L 1/08*    (2006.01)
(Continued)

(52) U.S. Cl.
CPC ............... *H04W 72/23* (2023.01); *H04L 1/08* (2013.01); *H04W 74/04* (2013.01); *H04W 72/044* (2013.01)

(58) Field of Classification Search
CPC ... H04W 72/23; H04W 74/04; H04W 72/044; H04W 56/00; H04W 74/006;
(Continued)

(56) References Cited

U.S. PATENT DOCUMENTS

2007/0254656 A1   11/2007  Dalsgaard
2010/0113051 A1*   5/2010  Du .................. H04W 72/20
                                                    455/450
(Continued)

FOREIGN PATENT DOCUMENTS

CN        101835174 A      9/2010
CN        101883398 A     11/2010
(Continued)

OTHER PUBLICATIONS

Intel Corporation "Introduction of EDT for eMTC and NB-IoT in Rel-15 TS 36.321", 3GPP TSG RAN WG2 Meeting #102, Busan, Republic of Korea, May 21-25, 2018, R2-1808865.
(Continued)

*Primary Examiner* — Edan Orgad
*Assistant Examiner* — Malick A Sohrab
(74) *Attorney, Agent, or Firm* — CANTOR COLBURN LLP

(57) ABSTRACT

A data transmission method and device, and a resource determination method and device, the method including user equipment (UE) transmitting a signal on one or more first uplink channel resources, where the signal includes one of the following: a single subcarrier signal, a multi-subcarrier signal, or a random access signal.

16 Claims, 5 Drawing Sheets

(51) Int. Cl.
*H04W 72/23* (2023.01)
*H04W 74/04* (2009.01)

(58) Field of Classification Search
CPC ......... H04W 74/0833; H04W 72/0446; H04W 72/0453; H04L 1/08; H04L 5/0007; H04L 5/0094; Y02D 30/70
See application file for complete search history.

(56) References Cited

U.S. PATENT DOCUMENTS

| | | | |
|---|---|---|---|
| 2011/0013546 A1* | 1/2011 | Hao | H04L 5/005 370/294 |
| 2013/0064165 A1* | 3/2013 | Chen | H04W 56/0045 370/312 |
| 2016/0056934 A1* | 2/2016 | Li | H04L 25/022 370/330 |
| 2016/0183295 A1 | 6/2016 | Liu et al. | |
| 2017/0135134 A1* | 5/2017 | Rune | H04W 74/0833 |
| 2017/0164350 A1 | 6/2017 | Sun et al. | |
| 2017/0273079 A1 | 9/2017 | Park et al. | |
| 2017/0359746 A1 | 12/2017 | Lee et al. | |
| 2018/0115430 A1 | 4/2018 | Seo | |
| 2018/0167901 A1 | 6/2018 | Wang et al. | |
| 2018/0199359 A1 | 7/2018 | Cao et al. | |
| 2019/0313447 A1* | 10/2019 | Islam | H04W 74/006 |
| 2020/0281024 A1* | 9/2020 | Luo | H04W 72/0446 |

FOREIGN PATENT DOCUMENTS

| | | | | |
|---|---|---|---|---|
| CN | 102696210 | A | 9/2012 | |
| CN | 107046728 | A | 8/2017 | |
| CN | 108282298 | A | 7/2018 | |
| CN | 108366033 | A | 8/2018 | |
| EP | 2117243 | A1 | 11/2009 | |
| EP | 3506698 | A1 | 7/2019 | |
| KR | 20180053497 | A * | 5/2018 | ............ H04W 24/02 |
| WO | 2008131292 | A1 | 10/2008 | |
| WO | 2015066385 | A2 | 5/2015 | |

OTHER PUBLICATIONS

International Search Report for corresponding application PCT/CN2019/100024 filed Aug. 9, 2019; Mail date Oct. 30, 2019.
Written Opinion of the International Searching Authority for corresponding application PCT/CN2019/100024 filed Aug. 9, 2019; Mail date Oct. 30, 2019.
European Search Report for corresponding application 19847270.6: Report dated Oct. 5, 2021.
Ericsson, Duration of on-demand SI broadcast, 3GPP TSG-RAN WG2 #101, Athens Greece, Feb. 26, 2018, R2-1802327.

* cited by examiner

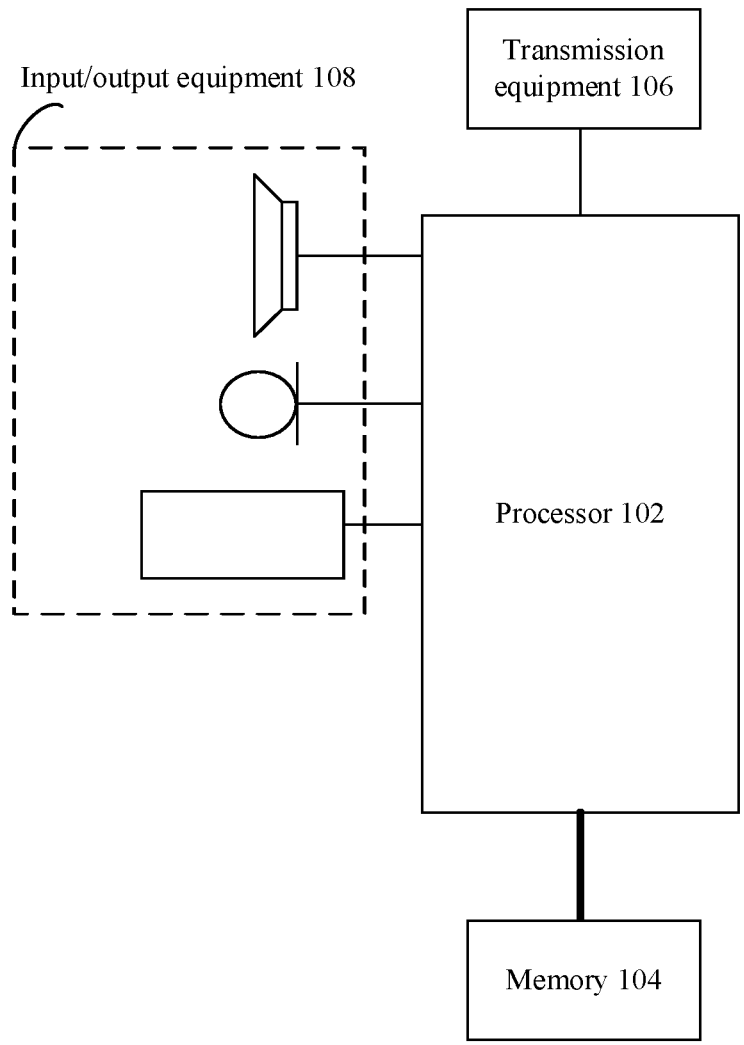

TO: Time domain offset

TO: Time domain offset

| Cyclic prefix | 1st symbol | 2nd symbol | ...... | Kth symbol |

| Cyclic prefix | 1st symbol | 2nd symbol | ...... | Kth symbol | Guard Period |

| Cyclic prefix | 1st symbol | Cyclic prefix | 2nd symbol | ...... | Cyclic prefix | Kth symbol |

| Cyclic prefix | 1st symbol | Cyclic prefix | 2nd symbol | ...... | Cyclic prefix | Kth symbol | Guard Period |

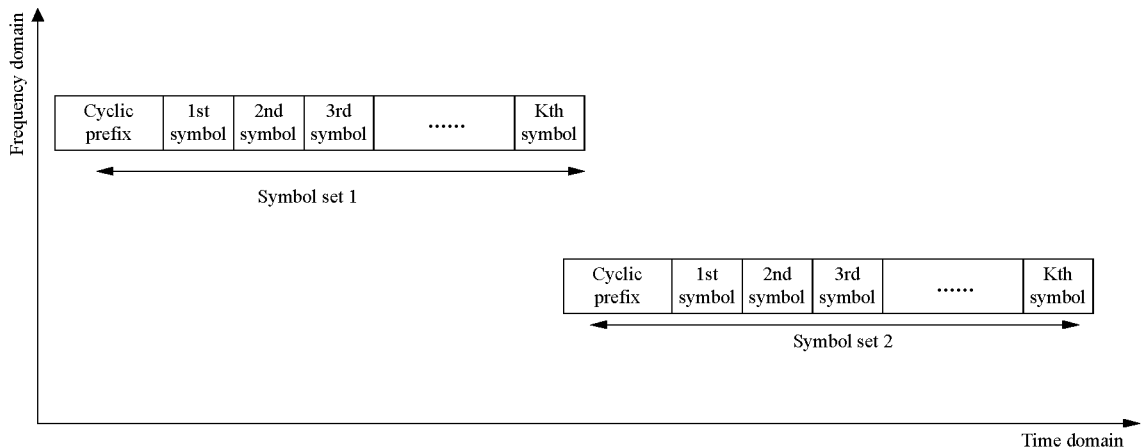

Fig. 11

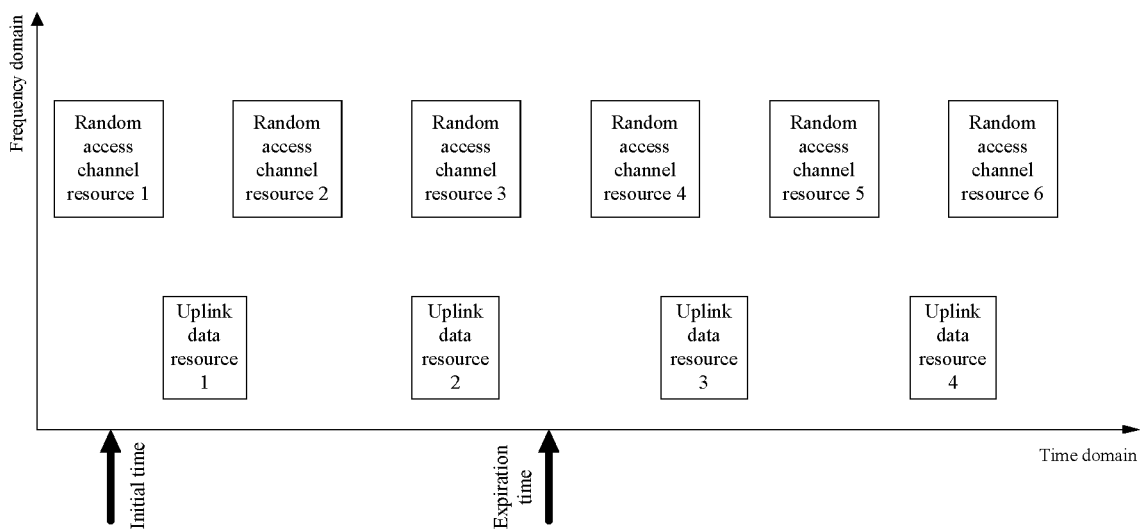

Fig. 12

| A base station sends configuration information of a first uplink channel for acquiring a position of one or more first uplink channel resources to UE, wherein the one or more first uplink channel resources are used by the UE to transmit a signal, and the signal comprises one of the following: a single subcarrier signal, a multi-subcarrier signal, or a random access signal | S1302 |

Fig. 13

DATA TRANSMISSION METHOD AND DEVICE AND RESOURCE DETERMINATION METHOD AND DEVICE

The present disclosure claims the priority of the Chinese patent application filed before the China national intellectual property administration (CNIPA) with the application number 201810905138.4 on Aug. 9, 2018. The entire content of the present disclosure is incorporated into the present disclosure by reference.

TECHNICAL FIELD

The present disclosure relates to the field of communications, and in particular to a data transmission method and device, and a resource determination method and device.

BACKGROUND

With the development of intelligent user equipment (UE) and the enrichment of wireless data application services, the number of data users in wireless communication networks has increased significantly. The content of wireless data is no longer limited to traditional texts or images, and more and more multimedia service contents such as high-definition videos and mobile TV appear, thereby resulting in explosive growth of traffic in wireless communication networks. Mobile internet and internet of things services will become the main driving force for the development of mobile communications.

For the internet of things, the 3GPP standard organization has formulated two very representative communication standard protocols which are MTC (Machine Type Communication) and NB-IoT (Narrow Band Internet of Things).

However, there is a problem of excessively high power consumption of the UE in a process of data transmission in a non RRC-CONNECT state in the related technologies.

SUMMARY

The embodiments of the present disclosure provide a data transmission method and device and a resource determination method and device, which may at least solve the problem of high power consumption of UE in a process of data transmission in a non RRC-CONNECT state in the related technologies.

An embodiment of the present disclosure provides a data transmission method. The data transmission method includes: a UE transmits a signal on one or more first uplink channel resources, wherein the signal includes one of the following: a single subcarrier signal, a multi-subcarrier signal, or a random access signal.

In at least one exemplary implementation of the embodiment, the UE acquires a position of the one or more first uplink channel resources by receiving configuration information of a first uplink channel from a base station.

In at least one exemplary implementation of the embodiment, the one or more first uplink channel resources are located in one or more second uplink channel resources; the one or more second uplink channel resources include at least one of the following: a first type of second uplink channel resource which is a resource configured by the base station through first configuration information and used for indicating the UE to perform uplink data transmission; a second type of second uplink channel resource which is a time domain-frequency domain resource configured for the UE by the base station and used for performing non-contention-based random access to a channel; and a third type of second uplink channel resource which is a time domain-frequency domain resource configured by the base station and used for a random access channel.

In at least one exemplary implementation of the embodiment, the one or more first uplink channel resources are located in the one or more second uplink channel resources, including: the UE selects M second uplink channel resources from N second uplink channel resource as the one or more first uplink channel resources, wherein N and M are positive integers.

In at least one exemplary implementation of the embodiment, the one or more first uplink channel resources are located in the one or more second uplink channel resources, further including: in a time domain interval, the UE selects Q second uplink channel resources in a second uplink channel resource set as the one or more first uplink channel resources, wherein the second uplink channel resource set includes second uplink channel resources in the time domain interval, and Q is a positive integer.

In at least one exemplary implementation of the embodiment, an initial position of the time domain interval is indicated through signaling or determined according to default configuration.

In at least one exemplary implementation of the embodiment, a length of the time domain interval includes one of the following: a transmission period of the signal; or a configuration period of the first type of second uplink channel resource.

In at least one exemplary implementation of the embodiment, the Q second uplink channel resources include one of the following: in the time domain interval, first Q second uplink channel resources in the second uplink channel resource set; in the time domain interval, last Q second uplink channel resources in the second uplink channel resource set; and in the time domain interval, Q second uplink channel resources selected in the second uplink channel resource set according to a preset order.

In at least one exemplary implementation of the embodiment, a first configuration period of the one or more first uplink channel resources is L times the second type of second uplink channel resource, or the first configuration period of the one or more first uplink channel resources is L times a second configuration period of the second type of second uplink channel resource, wherein L is a positive integer.

In at least one exemplary implementation of the embodiment, in a case where the signal is the random access signal, configuration information of the signal is configured to the UE by the base station through second configuration information, wherein the second configuration information includes one of the following: a random access sequence index corresponding to the signal; the number of times of repeated transmissions of the signal; or a subcarrier index occupied by a first symbol set when the signal is transmitted.

In at least one exemplary implementation of the embodiment, a random access sequence index corresponding to the signal is included in a random access sequence index set configured in a non-contention-based random access process, and/or the subcarrier index occupied by the first symbol set when the signal is transmitted is included in the random access sequence index set configured in the non-contention-based random access process.

In at least one exemplary implementation of the embodiment, the UE transmits the signal on the first type of second uplink channel resource when at least one of the following conditions is met: a size of the first type of second uplink channel resource is greater than or equal to a size of resources required for transmitting the signal; and the UE receives indication information sent by the base station, wherein the indication information indicates the UE to transmit the signal on the first type of second uplink channel resource.

In at least one exemplary implementation of the embodiment, in a case where the signal is the single subcarrier signal, the single subcarrier signal includes P symbol sets, wherein P is a positive integer.

In at least one exemplary implementation of the embodiment, each of the P symbol sets includes: at least one cyclic prefix (CP) and at least one symbol; or, at least one CP, at least one symbol, and a guard period, wherein one symbol set occupies a same subcarrier index or a same frequency resource in a frequency domain.

In at least one exemplary implementation of the embodiment, a sequence with a length of K is sent on K symbols in the symbol set, wherein the sequence includes one of the following: a ZC sequence with a length of K, an orthogonal sequence with a length of K, a pseudo-random sequence with a length of K, a Gold sequence with a length of K, a sequence with a length of K formed by performing cyclic shift on a ZC sequence with a length of I, a sequence with a length of K formed by performing cyclic shift on an orthogonal sequence with a length of I, a sequence with a length of K formed by performing cyclic shift on a pseudo-random sequence with a length of I, or a sequence with a length of K formed by performing cyclic shift on a Gold sequence with a length of I, where K and I are positive integers, and K is greater than I.

In at least one exemplary implementation of the embodiment, the single-subcarrier signal supports frequency-domain frequency hopping. In the P symbol sets, O types of frequency-domain frequency hopping levels are configured. Each frequency-domain frequency hopping level corresponds to one frequency hopping interval and at least one frequency hopping opportunity; and/or in frequency-domain frequency hopping opportunities corresponding to a frequency-domain frequency hopping level o, the number of positive frequency hopping opportunities is equal to the number of negative frequency hopping opportunities, wherein the frequency-domain frequency hopping level o is included in the O types of frequency-domain frequency hopping levels.

In at least one exemplary implementation of the embodiment, in a case where the signal is multi-subcarrier signal, the method further includes the following operation. at least one multi-subcarrier signal is transmitted on the one or more first uplink channel resources. A frequency domain bandwidth occupied by the multi-subcarrier signal is less than or equal to a frequency domain bandwidth corresponding to the one or more first uplink channel resources.

In at least one exemplary implementation of the embodiment, a sum of a time domain length of the at least one multi-subcarrier signal is equal to a time domain length of the one or more first uplink channel resources.

In at least one exemplary implementation of the embodiment, information carried in the signal is predetermined information.

In at least one exemplary implementation of the embodiment, the predetermined information includes at least one of the following: a demodulation dedicated reference signal; a reference signal; and predetermined bit information.

In at least one exemplary implementation of the embodiment, when the UE transmits the signal on the one or more first uplink channel resources, one of the following conditions needs to be met: a timer for timing advance update expires; time for timing advance update arrives; time for timing advance update arrives, and T is not less than a preset threshold, wherein T is an interval between an update period time of timing advance and most recent time of receiving update information of timing advance from the base station; saved timing advance becomes invalid; the UE receives indication information, which triggers transmission of the signal, in a Msg2 in a random access process; the UE receives indication information, which triggers transmission of the signal, in a Msg4 in the random access process; the UE receives indication information, which triggers transmission of the signal, in downlink control information, wherein the downlink control information is carried in a downlink control channel which is transmitted in a UE-dedicated search space of the downlink control channel; the UE receives indication information, which triggers transmission of the signal, in downlink control information, wherein the downlink control information is carried in a downlink control channel which is transmitted in a search space of the downlink control channel configured for the UE.

In at least one exemplary implementation of the embodiment, after the UE receives the update information of the timing advance from the base station, the timer for timing advance update is reset.

In at least one exemplary implementation of the embodiment, when the UE transmits the signal on the one or more first uplink channel resources, one of the following conditions needs to be met: in a period of time, among F1 uplink data transmissions performed by the UE on the first type of second uplink channel resource, the number of times of retransmissions needed for realizing successful uplink data transmission is greater than or equal to G1, wherein F1 and G1 are positive integers, and F1 is greater than G1; among F2 consecutive uplink data transmissions performed by the UE on the first type of second uplink channel resource, the number of times of retransmissions needed for realizing successful uplink data transmission is greater than or equal to G2, wherein F2 and G2 are positive integers, and F2 is greater than G2; in one uplink data transmission performed by the UE on the first type of second uplink channel resource, the number of times of retransmission is not less than G3, wherein G3 is a positive integer.

In at least one exemplary implementation of the embodiment, when the UE transmits the signal on the one or more first uplink channel resources, one of the following conditions needs to be met: after performing uplink data transmission on the first type of second uplink channel resource, the UE fails to detect indication information, which indicates successful uplink data transmission, sent by the base station; after performing uplink data transmission on the first type of second uplink channel resource, the UE fails to detect resource scheduling information, which indicates to conduct retransmission for the uplink data transmission, sent by the base station; or after performing uplink data transmission on the first type of second uplink channel resource, the UE detects a downlink control channel in a corresponding search space of the downlink control channel.

In at least one exemplary implementation of the embodiment, in a case where the UE detects the downlink control channel in the search space of the downlink control channel, downlink control information carried in the downlink control channel includes one of the following: indication information of timing advance invalidation; indication information of timing advance update; and indication information used for transmitting the signal.

In at least one exemplary implementation of the embodiment, the one or more first uplink channel resources used for transmitting the signal include: one or more first uplink channel resources in a time domain position after a moment when one or more conditions that need to be satisfied are satisfied.

The embodiment of the present disclosure provides a resource determination method, including:

a base station sends configuration information of a first uplink channel for acquiring a position of one or more first uplink channel resources to a UE, wherein the one or more first uplink channel resources are used by the UE for transmitting a signal, and the signal includes one of the following: a single subcarrier signal, a multi-subcarrier signal, or a random access signal.

In at least one exemplary implementation of the embodiment, the one or more first uplink channel resources are located in one or more second uplink channel resources, and the one or more second uplink channel resources include at least one of the following: a first type of second uplink channel resource which is a resource configured by the base station through first configuration information and used for indicating the UE to perform uplink data transmission; a second type of second uplink channel resource which is a time domain-frequency domain resource configured for the UE by the base station and used for performing non-contention-based random access to a channel; and a third type of second uplink channel resource which is a time domain-frequency domain resource configured by the base station and used for a random access channel.

The embodiment of the present disclosure provides a data transmission device, which is located in the UE, and includes: a transmission module, configured to transmit a signal on one or more first uplink channel resources, wherein the signal includes one of the following: a single subcarrier signal, a multi-subcarrier signal, or a random access signal.

The embodiment of the present disclosure provides a resource determination device, which is located in a base station, and includes: a determining module, configured to transmit configuration information of a first uplink channel for acquiring a position of one or more first uplink channel resources to a UE, wherein the one or more first uplink channel resources are used by the UE for transmitting a signal, and the signal includes one of the following: a single subcarrier signal, a multi-subcarrier signal, or a random access signal.

The embodiment of the present disclosure provides a storage medium. A computer program is stored in the storage medium, and is configured to execute the operations in any one of the above method embodiments at runtime.

The embodiment of the present disclosure provides an electronic device, which includes a memory and a processor, wherein a computer program is stored in the memory, and the processor is configured to run the computer program so as to execute the operations in any one of the above method embodiments at runtime.

According to the embodiments of the present disclosure, one of a single-subcarrier signal, a multi-subcarrier signal, or a random access signal is transmitted on one or more uplink channel resources, thereby solving the problem of excessive high power consumption of the UE in a process of data transmission in a non RRC-CONNECT state in the related technologies, and achieving an effect of reducing the transmission power consumption of the UE in data transmission process.

BRIEF DESCRIPTION OF THE DRAWINGS

The accompanying drawings described herein are used to provide a deeper understanding of the present disclosure, and constitute a part of the present disclosure. The exemplary embodiments of the present disclosure and the description thereof are used to explain the present disclosure. The drawings and the exemplary embodiment do not constitute limitations to the present disclosure. In the drawings:

FIG. 1 is a block diagram showing the hardware structure of a mobile UE involved in a data transmission method according to the embodiment of the present disclosure;

FIG. 2 is a flowchart of a data transmission method according to the embodiment of the present disclosure;

FIG. 11 is a schematic diagram of another signal structure of a single subcarrier according to the embodiment of the present disclosure;

FIG. 12 is a schematic diagram of transmission of uplink data resources according to the embodiment of the present disclosure;

FIG. 13 is a flowchart of a resource determination method according to the embodiment of the present disclosure;

DETAILED DESCRIPTION OF THE EMBODIMENTS

Figure 3:
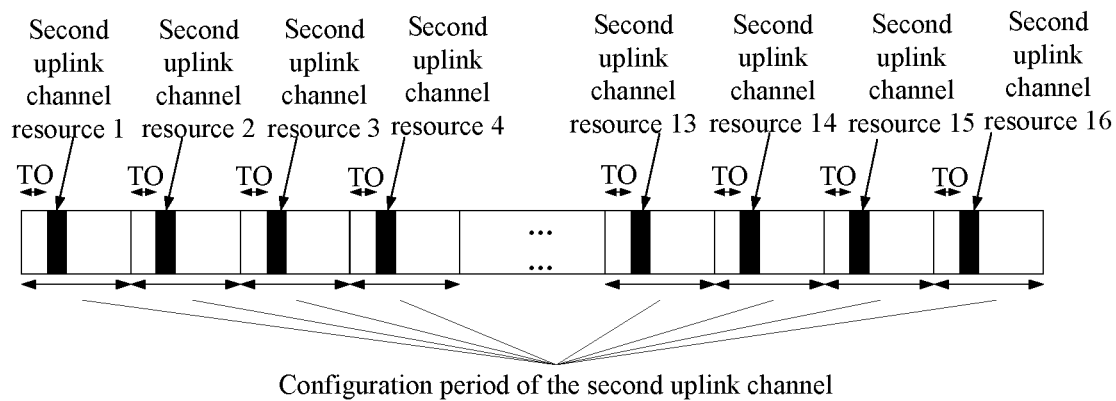
FIG. 3 is a schematic diagram of uplink channel resource configuration according to the embodiment of the present disclosure.

Considering that the transmission of data packets which have relatively small sizes and are transmitted at intervals is a typical service of UE of MTC and NB-IoT, an Early Data Transmission (EDT) technology is introduced in the Release15 version of the communication standard protocol of MTC and NB-IoT. The EDT technology allows the UE to use Message 3 (Msg3) to transmit data to the base station in the related process of random access, that is, the UE does not need to enter the radio resource control connection state (abbreviated as RRC-CONNECT), and can directly transmit data to the base station in the radio resource control idle state (abbreviated as RRC-IDLE). The EDT technology can save the power of the UE, and meanwhile improve the uplink spectrum efficiency of the system. However, since the EDT can only support the UE to transmit one data packet to the base station, when the UE has multiple data packets transmitted at intervals, the EDT function cannot support the transmission of multiple data packets. Therefore, a new data packet transmission method is needed to support the UE to transmit data packet services at intervals in the RRC-IDLE state. In the EDT technology, the data is transmitted in Msg3 in the random access process. However, before the Msg3 message in the random access process, the UE needs to send a physical random access channel preamble (PRACH Preamble, also known as Msg1) to the base station and receive a random access response message (Random Access Response, also known as Msg2) sent by the base station. Each time when the UE sends a data packet according to the EDT technology, the UE needs to firstly send Msg1 and receive Msg2, which will consume the power of the UE. Therefore, it can be concluded that there is a problem of excessively high power consumption of the UE in a process of data transmission in a non RRC-CONNECT state in the related technologies.

The embodiments of the present disclosure provide a data transmission method and device and a resource determination method and device, which may at least solve the problem of high power consumption of UE in a process of data transmission in a non RRC-CONNECT state in the related technologies.

The present disclosure is described below in detail with reference to the drawings and in conjunction with the embodiments. It is to be noted that embodiments in the present disclosure and characteristics in the embodiments may be combined to derive other embodiments not explicitly described.

It is to be noted that the terms "first", "second" and the like in the specification, the claims and the drawings of the present disclosure are used to distinguish similar objects, and are not used to describe a specific sequence or a precedence order.

Embodiment I

The method embodiment provided by the embodiment I of the present disclosure may be executed in a mobile UE, a computer UE or similar arithmetic devices. Taking the implementation on the mobile UE as an example, FIG. 1 is a block diagram showing the hardware structure of a mobile UE involved in a data transmission method according to the embodiment of the present disclosure. As shown in FIG. 1, the mobile UE 10 may include one or more (only one is shown in FIG. 1) processors 102 (the processor 102 may include, but is not limited to a processing device such as a microprogrammed control unit or a field-programmable gate array), and a memory 104 for storing data. In at least one exemplary implementation of the embodiment, the above mobile UE may further include transmission equipment 106 for communication functions and an input/output equipment 108. Those having ordinary skill in the art can understand that the structure shown in FIG. 1 is only for illustration, and does not limit the structure of the above mobile UE. For example, the mobile UE 10 may include more or fewer components than shown in FIG. 1, or have configuration different from that shown in FIG. 1.

The memory 104 may be used to store computer programs, for example, software programs and modules of application software, and computer programs corresponding to the data transmission method in the embodiment of the present disclosure. The processor 102 can execute various functional applications and data processing by running the computer program stored in the memory 104, so as to achieve the above method. The memory 104 may include a high-speed random access memory, and may also include a non-volatile memory; such as one or more magnetic storage devices, flash memories, or other non-volatile solid-state memories. In some examples, the memory 104 may further include memories remotely arranged with respect to the processor 102, and these remote memories may be connected to the mobile UE 10 through networks. Examples of the above networks include, but are not limited to, the Internet, corporate intranets, local area networks, mobile communication networks, and combinations thereof.

The transmission equipment 106 is used for receiving or transmitting data via a network. The specific examples of the above network may include a wireless network provided by a communication provider of the mobile UE 10. In one example, the transmission equipment 106 includes a network interface controller (abbreviated as NIC), which can be connected to other network equipment through a base station to communicate with the Internet. In an example, the transmission equipment 106 may be a radio frequency (abbreviated as RF) module, which is used to communicate with the Internet in a wireless manner.

The embodiment provides a data transmission method running on the above mobile UE. FIG. 2 is a flowchart of a data transmission method according to the embodiment of the present disclosure. As shown in FIG. 2, the process includes the following operation S202.

At S202, a UE transmits a signal on one or more first uplink channel resources, wherein the signal includes one of the following: a single subcarrier signal, a multi-subcarrier signal, or a random access signal.

It should be noted that in the embodiment, the UE may be a single UE or a group of UE including multiple pieces of UE.

In at least one exemplary implementation of the embodiment, a base station performs estimation of timing advance (TA for short) based on a detection signal.

In at least one exemplary implementation of the embodiment, the UE acquires a position of the one or more first uplink channel resources by receiving configuration information of a first uplink channel from a base station.

In at least one exemplary implementation of the embodiment, the position of the one or more first uplink channel resources includes a frequency domain position and a time domain position.

In at least one exemplary implementation of the embodiment, the one or more first uplink channel resources are one or more uplink channel resources dedicated for transmitting the signal by the UE; or the one or more first uplink channel resources are one or more second uplink channel resources. The following description is made for the case where the one or more first uplink channel resources are one or more second uplink channel resources.

In at least one exemplary implementation of the embodiment, the one or more first uplink channel resources are located in the one or more second uplink channel resources. The one or more second uplink channel resources include at least one of the following: a first type of second uplink channel resource which is a resource configured by the base station through first configuration information and used for indicating the UE to perform uplink data transmission; a second type of second uplink channel resource which is a time domain-frequency domain resource configured for the UE by the base station and used for performing non-contention-based random access to a channel; a third type of second uplink channel resource which is a time domain-frequency domain resource configured by the base station and used for a random access channel; and a fourth type of second uplink channel resource which is configured by the base station and is dedicated for transmission of the signal.

It should be noted that although the one or more first uplink channel resources are used for transmitting the signal, the one or more first uplink channel resources may also have other functions. Even if only one or several types of second uplink channel resources among the various types of second uplink channel resources are used for transmitting the signal, in order not to prevent the one or more first uplink channel resources from performing other functions, other second uplink channel resources that do not perform the signal transmission function can also be carried while the corresponding type of second uplink channel resources for transmitting the signal are carried. For example, when the UE uses the first type of second uplink channel resource to transmit the signal, the second type of second uplink channel resource may simultaneously transmit the signal along with the first type of second uplink channel resource.

In at least one exemplary implementation of the embodiment, the first type of second uplink channel resource may be used for uplink data transmission in a non RRC-CONNECT state, wherein the non RRC-CONNECT state includes at least an RRC-IDLE state.

In at least one exemplary implementation of the embodiment, the first configuration information includes at least one of the following: position information of the one or more second uplink channel resources; and configuration information of search space of a downlink control channel. The information carried on the downlink control channel includes downlink control information (abbreviated as DCI).

In at least one exemplary implementation of the embodiment, for a group of UE, when the one or more second uplink channel resources are one or more shared resources used by multiple pieces of UE in the group of UE for transmitting uplink data, the first configuration information is carried in system information (abbreviated as SI).

In at least one exemplary implementation of the embodiment, when the one or more second uplink channel resources are one or more dedicated resources of the UE, the first configuration information is carried in a Radio Resource Control (abbreviated as RRC) message.

In at least one exemplary implementation of the embodiment, the one or more first uplink channel resources are located in the one or more second uplink channel resources. Specifically, the UE may select M second uplink channel resources from N second uplink channel resource as the one or more first uplink channel resources, wherein N and M are positive integers.

In at least one exemplary implementation of the embodiment, if M is equal to 0, it means that the one or more first uplink channel resources are not configured in the N second uplink channel resources.

In at least one exemplary implementation of the embodiment, for different sets of N second uplink channel resources, the values of the number M of the selected second uplink channel resources can be the same. Alternatively, for different sets of N second uplink channel resources, the corresponding values of the number M of second uplink channel resources selected as the one or more first uplink channel resources can be independently configured.

In at least one exemplary implementation of the embodiment, the UE is indicated to select the M second uplink channel resources from N second uplink channel resource as the one or more first uplink channel resources by at least one of the following methods: the UE is indicated to select the M second uplink channel resources from N second uplink channel resource as the one or more first uplink channel resources according to first indication information sent by the base station through signaling; or the UE is indicated to select the M second uplink channel resources from N second uplink channel resource as the one or more first uplink channel resources according to second indication information determined according to default configuration of the UE.

In at least one exemplary implementation of the embodiment, the first indication information includes a Bitmap.

In at least one exemplary implementation of the embodiment, the bit configured as "1" in the Bitmap indicates that the second uplink channel resource corresponding to the position is used as the first uplink channel resource, and the bit configured as "0" in the Bitmap indicates that the second uplink channel resource corresponding to the position is not used as the first uplink channel resource.

In at least one exemplary implementation of the embodiment, the length of the Bitmap is N, that is, the position of the one or more second uplink channel resources selected as the one or more first uplink channel resources from the second uplink channel resources is indicated by one Bitmap.

In at least one other exemplary implementation of the embodiment, the length of the Bitmap may also be N/B, that is, the position of the one or more second uplink channel resources selected as the one or more first uplink channel resources from N second uplink channel resource is indicated by B Bitmaps, wherein B is a positive integer.

In at least one exemplary implementation of the embodiment, the second indication information includes: the positions of the M second uplink channel resources selected from the N second uplink channel resources as the one or more the first uplink channel resources.

In at least one exemplary implementation of the embodiment, the positions include one of the following: positions corresponding to first M second uplink channel resources among the N second uplink channel resources; positions corresponding to last M second uplink channel resources among the N second uplink channel resources; and positions corresponding to default M second uplink channel resources among the N second uplink channel resources.

In at least one exemplary implementation of the embodiment, in order to facilitate the understanding of the above content in the embodiment, the following detailed description is provided for configuration of the one or more first uplink channel resources in the one or more second uplink channel resources in the embodiment.

FIG. 3 is a schematic diagram of uplink channel resource configuration according to the embodiment of the present disclosure. As shown in FIG. 3, N second uplink channel resources are schematically configured, wherein N is 16.

(1) After the UE receives the first indication information sent by the base station through signaling, when the UE determines through analysis that the Bitmap in the first indication information is "1000000010000000", the UE determines the second uplink channel resource 1 and the second uplink channel resource 9 as the first uplink channel resources, and transmits a signal on the determined first uplink channel resources.

(2) When the UE determines, according to default configuration stored locally in the UE, that the carried default configuration indicates to use the first nine second uplink channel resources among sixteen second uplink channel resources as the first uplink channel resources, the UE determines the second uplink channel resources from the second uplink channel resource 1 to the second uplink channel resource 9 in FIG. 3 as the first uplink channel resources, and transmits the signal on the determined first uplink channel resources.

(3) The UE determines, according to default configuration stored locally in the UE, that the carried default configuration indicates to use the second uplink channel resource 1, the second uplink channel resource 3, and the second uplink channel resource 15 among the sixteen second uplink channel resources as the first uplink channel resources, and transmits the signal on the determined first uplink channel resources.

In at least one exemplary implementation of the embodiment, in a time domain interval, the UE selects Q second uplink channel resources in a second uplink channel resource set as the one or more first uplink channel resources, wherein the second uplink channel resource set includes second uplink channel resources in the time domain interval, and Q is a positive integer.

In at least one exemplary implementation of the embodiment, an initial position of the time domain interval is indicated through signaling or determined according to default configuration.

For example, the default reference time is the initial time of Frame 0 (the first frame, denoted as Frame 0). The base station indicates the offset of the initial position of the time domain interval relative to the default reference time through signaling, and then acquires the initial position of the time domain interval. In addition, the initial position of the second time domain interval and/or subsequent time domain intervals can be acquired through the length of the time domain interval.

When the initial position of the time domain interval is determined according to the default configuration, for example, the initial position of the first time domain interval is configured as the initial time of Frame 0 (the first frame, denoted as Frame 0) by default. In addition, the initial position of the second time domain interval and/or subsequent time domain intervals can be acquired by the length of the time domain interval.

In at least one exemplary implementation of the embodiment, a length of the time domain interval includes one of the following: a transmission period of the signal; and a configuration period of the first type of second uplink channel resource.

In at least one exemplary implementation of the embodiment, the length of the time domain interval is indicated by the base station through signaling, or the length of the time domain interval is determined by default configuration in a standard.

In at least one exemplary implementation of the embodiment, the Q second uplink channel resources include one of the following: in the time domain interval, first Q second uplink channel resources in the second uplink channel resource set; in the time domain interval, last Q second uplink channel resources in the second uplink channel resource set; and in the time domain interval, Q second uplink channel resources selected in the second uplink channel resource set according to a preset order.

In at least one exemplary implementation of the embodiment, in order to facilitate the understanding of the above content in the embodiment, the following detailed description is provided in the embodiment for configuration of the one or more first uplink channel resources in the one or more second uplink channel resources.

Figure 4:
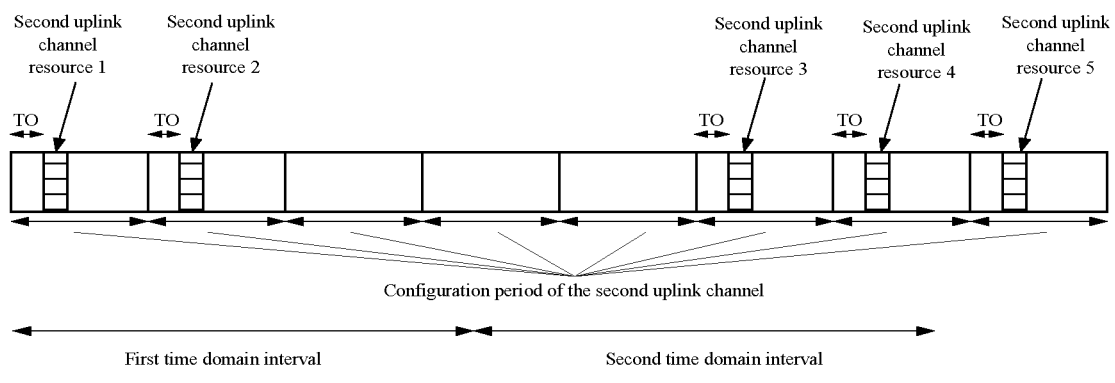
FIG. 4 is a schematic diagram of another uplink channel resource configuration according to the embodiment of the present disclosure.

FIG. 4 is a schematic diagram of another uplink channel resource configuration according to the embodiment of the present disclosure. As shown in FIG. 4, it is schematically configured that there are only 5 periods of second uplink channel resources among eight configuration periods of the second uplink channel resources. The 5 periods of second uplink channel resources are respectively numbered as the second uplink channel resource 1 to the second uplink channel resource 5 in FIG. 4.

The length of the time domain interval is the transmission period of the signal. It can be seen from FIG. 4 that there are two complete time domain intervals in the eight configuration periods of the second uplink channel resources, which are respectively defined as the first time domain interval and the second time domain interval.

In FIG. 4, a selection rule of the first uplink channel resources is as follows: the first second uplink channel resource among the second uplink channel resources included in each time domain interval is used as the first uplink channel resource. Therefore, in this case, in the first time domain interval, the first uplink channel resource is the second uplink channel resource 1; and in the second time domain interval, the first uplink channel resource is the second uplink channel resource 3.

It should be noted that other selection rules are also applicable to the configuration shown in FIG. 4. For example, the second uplink channel resources 2 and 5 are selected as the first uplink channel resources; or the second uplink channel resources numbered with odd numbers, that is, the second uplink channel resources 1, 3, and 5 are selected as the first uplink channel resources.

Figure 5:
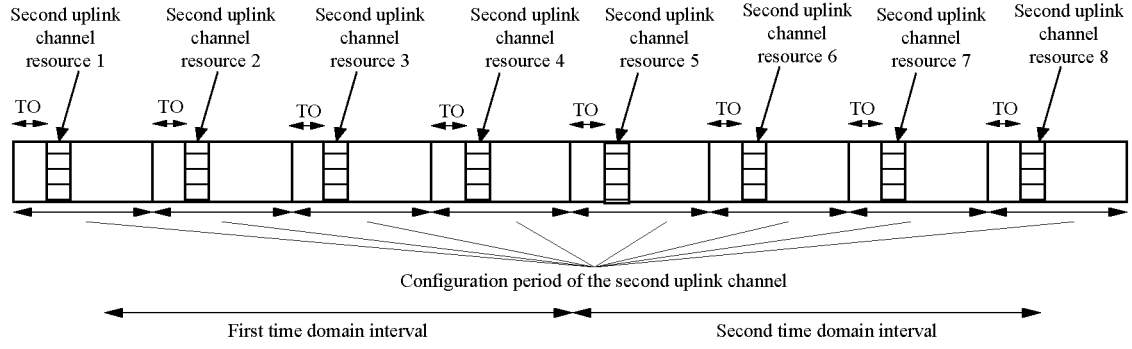
FIG. 5 is a schematic diagram of still another uplink channel resource configuration according to the embodiment of the present disclosure.

FIG. 5 is a schematic diagram of still another uplink channel resource configuration according to the embodiment of the present disclosure. As shown in FIG. 5, it is schematically configured that there are 8 periods of second uplink channel resources among eight configuration periods of the second uplink channel resources. The 8 periods of second uplink channel resources are respectively numbered as the second uplink channel resource 1 to the second uplink channel resource 8 in FIG. 5.

The length of the time domain interval is the transmission period of the signal. In FIG. 5, there are two complete time domain intervals in the eight configuration periods of the second uplink channel resources, which are respectively defined as the first time domain interval and the second time domain interval.

In FIG. 5, a selection rule of the first uplink channel resources is as follows: the first second uplink channel resource among the second uplink channel resources included in each time domain interval is used as the first uplink channel resource. Therefore, in this case, in the first time domain interval, the first uplink channel resource is the second uplink channel resource 1; and in the second time domain interval, the first uplink channel resource is the second uplink channel resource 5.

It should be noted that other selection rules are also applicable to the configuration shown in FIG. 5. For example, the second uplink channel resources 4 and 8 are selected as the first uplink channel resources; or the second uplink channel resources numbered with even numbers, that is, the second uplink channel resources 2, 4, 6 and 8 are selected as the first uplink channel resources.

In at least one exemplary implementation of the embodiment, a first configuration period of the one or more first uplink channel resources is L times the second type of second uplink channel resource, or is L times a second configuration period of the second type of second uplink channel resource, wherein L is a positive integer.

For example, when the serial numbers of the second uplink channel resources are 0, 1, 2, 3 . . . , if the value of L is 10, the serial numbers of the second uplink channel resources corresponding to the first uplink channel resources are 0, 10 (i.e., 0+10=10), and 20 (i.e., 0+10*2=20).

In at least one exemplary implementation of the embodiment, when there is an offset, for example, the offset is 2, the serial numbers of the second uplink channel resources corresponding to the first uplink channel resources are 2 (i.e., 0+2=2), 12 (i.e., 0+2+10=12), 22 (i.e., 0+2+10*2=22).

In at least one exemplary implementation of the embodiment, in a case where the signal is the random access signal, configuration information of the signal is configured to the UE by the base station through second configuration information, wherein the second configuration information includes one of the following: a random access sequence index corresponding to the signal; the number of times of repeated transmissions of the signal; or a subcarrier index occupied by a first symbol set when the signal is transmitted.

In at least one exemplary implementation of the embodiment, a random access sequence index corresponding to the signal is included in a random access sequence index set configured in a non-contention-based random access process, and/or the subcarrier index occupied by the first symbol set when the signal is transmitted is included in the random access sequence index set configured in the non-contention-based random access process.

In at least one exemplary implementation of the embodiment, the UE transmits the signal on the first type of second uplink channel resource when at least one of the following conditions is met: a size of the first type of second uplink channel resource is greater than or equal to a size of the resources required for transmitting the signal; and the UE receives indication information sent by the base station, wherein the indication information indicates the UE to transmit the signal on the first type of second uplink channel resource.

In at least one exemplary implementation of the embodiment, in a case where the signal is the single subcarrier signal, the single subcarrier signal includes P symbol sets, wherein P is a positive integer.

In at least one exemplary implementation of the embodiment, the symbol set includes: at least one cyclic prefix (CP) and at least one symbol; or, at least one CP, at least one symbol, and a guard period. One symbol set occupies a same subcarrier index or a same frequency resource in a frequency domain.

In at least one exemplary implementation of the embodiment, the embodiment also provides a symbol set structure. The symbol set structure of the embodiment is shown in the FIG. 6 to FIG. 9.

Figures 6, 7, 8, 9, 10:
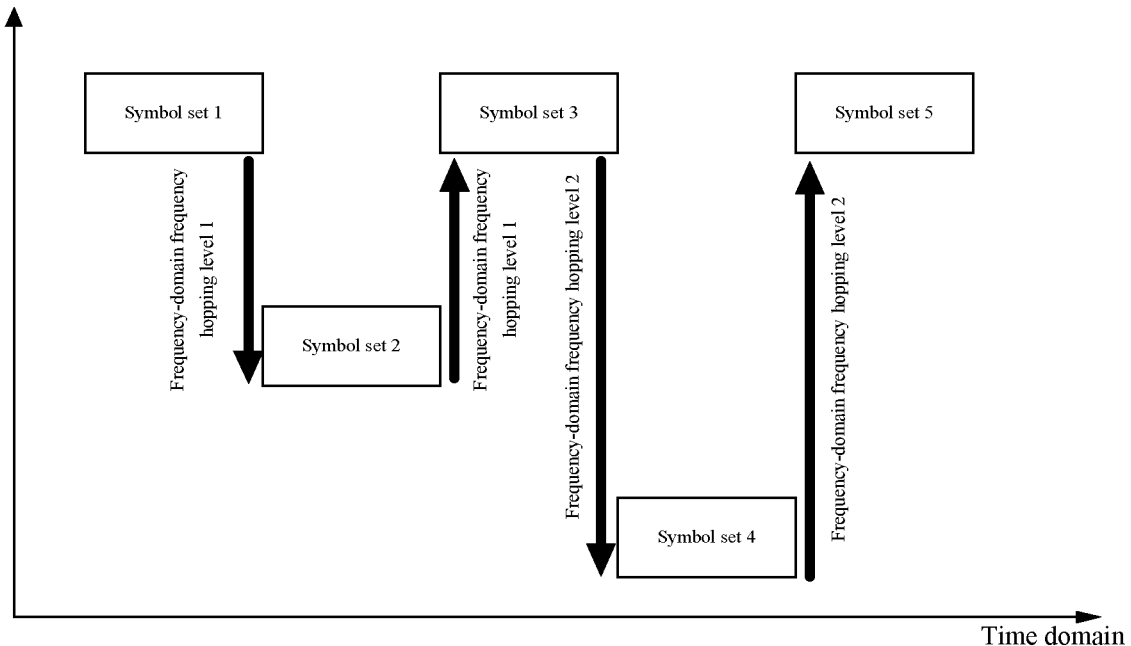
FIG. 6 is a schematic diagram of a first symbol set structure according to the embodiment of the present disclosure.
FIG. 7 is a schematic diagram of a second symbol set structure according to the embodiment of the present disclosure.
FIG. 8 is a schematic diagram of a third symbol set structure according to the embodiment of the present disclosure.
FIG. 9 is a schematic diagram of a fourth symbol set structure according to the embodiment of the present disclosure.
FIG. 10 is a schematic diagram of a signal structure of a single subcarrier according to the embodiment of the present disclosure.

FIG. 6 is a schematic diagram of a first symbol set structure according to the embodiment of the present disclosure. As shown in FIG. 6, the symbol set includes one CP and K OFDM symbols, wherein K is a positive integer.

FIG. 7 is a schematic diagram of a second symbol set structure according to the embodiment of the present disclosure. As shown in FIG. 7, the symbol set includes one CP, K OFDM symbols, and one guard period.

FIG. 8 is a schematic diagram of a third symbol set structure according to the embodiment of the present disclosure. As shown in FIG. 8, the symbol set includes K CPs and K OFDM symbols.

FIG. 9 is a schematic diagram of a fourth symbol set structure according to the embodiment of the present disclosure. As shown in FIG. 9, the symbol set includes K CPs, K OFDM symbols, and one guard period.

It should be noted that the indications in FIG. 6 to FIG. 9 exemplify several symbol set structures, and such exemplary illustration is not exhaustive. Of course, other symbol set structures based on the ideas of FIG. 6 to FIG. 9 are also within the protection scope of the embodiment.

In at least one exemplary implementation of the embodiment, a sequence with a length of K is sent on K symbols in the symbol set. The sequence includes one of the following: a ZC sequence with a length of K, an orthogonal sequence with a length of K, a pseudo-random sequence with a length of K, a Gold sequence with a length of K, a sequence with a length of K formed by performing cyclic shift on a ZC sequence with a length of I, a sequence with a length of K formed by performing cyclic shift on an orthogonal sequence with a length of I, a sequence with a length of K formed by performing cyclic shift on a pseudo-random sequence with a length of I, or a sequence with a length of K formed by performing cyclic shift on a Gold sequence with a length of I, where K and I are positive integers, and K is greater than I.

In at least one exemplary implementation of the embodiment, in order to facilitate the understanding on how to form the sequence with the length K by cyclic shift, the embodiment also enumerates the following ways for realization. The configured symbol set includes K symbols, K is 16, then the sequence with the length of 16 needs to be sent. For example, a ZC sequence with a length of K1 being 13 is selected, the expression of the sequence is (a0 a1 a2 a3 a4 a5 a6 a7 a8 a9 a10 a11 a12), and each variable in the expression is an element in the ZC sequence. As K−K1=3, the cyclic shift with the length of 3 needs to be performed on the ZC sequence.

In at least one exemplary implementation of the embodiment, the cyclic shift with the length of 3 can be implemented in the following way:

(1) the sequence with the length of 16 after performing the cyclic shift with the length of 3 is [a0 a1 a2 a3 a4 a5 a6 a7 a8 a9 a10 a11 a12 a0 a1 a2].

(2) the sequence with the length of 16 after performing the cyclic shift with the length of 3 is [a10 a11 a12 a0 a1 a2 a3 a4 a5 a6 a7 a8 a9 a10 a11 a12].

In at least one exemplary implementation of the embodiment, the single-subcarrier signal supports frequency-domain frequency hopping. In the P symbol sets, O types of frequency-domain frequency hopping levels are configured. Each frequency-domain frequency hopping level corresponds to one frequency hopping interval and at least one frequency hopping opportunity. Alternatively or additionally, in frequency-domain frequency hopping opportunities corresponding to a frequency-domain frequency hopping level o, the number of positive frequency hopping opportunities is equal to the number of negative frequency hopping opportunities, wherein the frequency-domain frequency hopping level o is included in the O types of frequency-domain frequency hopping levels.

In at least one exemplary implementation of the embodiment, in the frequency-domain frequency hopping opportunities corresponding to each of the O types of frequency-domain frequency hopping levels, the number of the positive frequency hopping opportunities is equal to the number of the negative frequency hopping opportunities. Of course, it is also possible that in only a part of the frequency-domain frequency hopping opportunities corresponding to the frequency-domain frequency hopping levels, the number of the positive frequency hopping opportunities is equal to the number of the negative frequency hopping opportunities. That is, in the frequency-domain frequency hopping opportunities corresponding to at least one of the O types of frequency-domain frequency hopping levels, the number of the positive frequency hopping opportunities is equal to the number of the negative frequency hopping opportunities.

In at least one exemplary implementation of the embodiment, in order to facilitate the understanding of the above content in the embodiment, the following detailed description is provided in the embodiment for configuration of the one or more first uplink channel resources in the one or more second uplink channel resources.

FIG. 10 is a schematic diagram of a signal structure of a single subcarrier according to the embodiment of the present disclosure. As shown in FIG. 10, P (the value of P is 5 in the present embodiment) symbol sets are included in FIG. 10, and are respectively the symbol set 1 to symbol set 5. The signal includes two types of frequency-domain frequency hopping levels, which are respectively the frequency-domain frequency hopping level 1 and the frequency-domain frequency hopping level 2. The frequency-domain frequency hopping intervals corresponding to the frequency-domain frequency hopping level 1 and frequency-domain frequency hopping level 2 are different.

For example, it is assumed in the present embodiment that the subcarrier index occupied by the symbol set 1 is 20, the frequency hopping interval corresponding to the frequency-domain frequency hopping level 1 is six subcarriers, and two frequency hopping opportunities are configured the frequency-domain frequency hopping level 1.

The first frequency hopping opportunity is from the symbol set 1 to the symbol set 2, and the frequency hopping direction is negative direction, that is, the subcarrier index occupied by the symbol set 2 is 20−6=14. The second frequency hopping opportunity is from the symbol set 2 to the symbol set 3, and the frequency hopping direction is positive direction, that is, the subcarrier index occupied by the symbol set 3 is 14+6=20. In the frequency-domain frequency hopping level 1, the number (which is equal to 1) of the positive frequency hopping opportunities is equal to the number (which is equal to 1) of the negative frequency hopping opportunities.

The frequency hopping interval corresponding to the frequency-domain frequency hopping level 2 is twelve subcarriers, and two frequency hopping opportunities are configured for the frequency-domain frequency hopping level 2.

The first frequency hopping opportunity is from the symbol set 3 to the symbol set 4, and the frequency hopping direction is negative direction, that is, the subcarrier index occupied by the symbol set 4 is 20−12=8. The second frequency hopping opportunity is from the symbol set 4 to the symbol set 5, and the frequency hopping direction is positive direction, that is, the subcarrier index occupied by the symbol set 5 is 8+12=20. In the frequency-domain frequency hopping level 2, the number (which is equal to 1) of the positive frequency hopping opportunities is equal to the number (which is equal to 1) of the negative frequency hopping opportunities.

FIG. 11 is a schematic diagram of another signal structure of a single subcarrier according to the embodiment of the present disclosure. As shown in FIG. 11, P (the value of P is 2 in the present embodiment) symbol sets are included in FIG. 11, and are respectively the symbol set 1 and the symbol set 2.

For example, the subcarrier index occupied by the symbol set 1 is 20, and a ZC sequence with the length of X is sent on X symbols. The subcarrier index occupied by the symbol set 2 is 14, and the ZC sequence with the length of X is sent on X symbols. The ZC sequences sent on the symbol set 1 and the symbol set 2 may be the same or different. The frequency domain hopping interval between the symbol set 1 and the symbol set 2 is six subcarrier intervals.

In at least one exemplary implementation of the embodiment, in a case where the signal is the multi-subcarrier signal, the method further includes the following operation. At least one multi-subcarrier signal is transmitted on the one or more first uplink channel resources, wherein the frequency domain bandwidth occupied by the at least one multi-subcarrier signal is not greater than the frequency domain bandwidth corresponding to the one or more first uplink channel resources.

In at least one exemplary implementation of the embodiment, the multi-subcarrier signal occupies one or more time domain symbols. It should be noted that the time domain symbol at least includes an OFDM symbol. The cyclic prefix (CP) may be included in the OFDM symbol and is located at the initial position of the OFDM symbol.

In at least one exemplary implementation of the embodiment, multiple multi-subcarrier signals may be the same or different. The multiple multi-subcarrier signals being different may be embodied in the following aspects: the numbers of OFDM symbols occupied by the multiple multi-subcarrier signals are different, or the generated multi-subcarrier signals are different.

In at least one exemplary implementation of the embodiment, the configuration information of the multi-subcarrier signal is configured in the first configuration information.

In at least one exemplary implementation of the embodiment, a sum of a time domain length of the at least one multi-subcarrier signal is equal to a time domain length of the one or more first uplink channel resources.

In at least one exemplary implementation of the embodiment, information carried in the signal is predetermined information.

In at least one exemplary implementation of the embodiment, the predetermined information includes at least one of the following: a demodulation dedicated reference signal; a reference signal; and predetermined bit information.

In at least one exemplary implementation of the embodiment, the signal carrying the predetermined information may be transmitted on the first type of second uplink channel resource. When the predetermined information carried in the signal is the DMRS or reference signal, at least one of the following conditions is included: the predetermined information carried in the signal is determined according to the size of frequency domain resources and/or the size of time domain resources in the first type of second uplink channel resource; and the position of the predetermined information carried in the signal in the first type of second uplink channel resource is determined according to the size of the frequency domain resources and/or the size of the time domain resources in the first type of second uplink channel resource. When the predetermined information carried in the signal is the predetermined bit information, at least one of the following conditions is included: the number of the predetermined bit information is greater than or equal to one. For example, the number of the bit information is determined according to the size of the frequency domain resources and/or the size of the time domain resources in the first type of second uplink channel resource.

In at least one exemplary implementation of the embodiment, when the UE transmits the signal on the one or more first uplink channel resources, one of the following conditions needs to be met: a timer for timing advance update expires; time for timing advance update arrives; time for timing advance update arrives, and T is not less than a preset threshold, wherein T is an interval between an update period time of timing advance and most recent time of receiving update information of timing advance from the base station; saved timing advance becomes invalid; the UE receives indication information, which triggers transmission of the signal, in a Msg2 in a random access process; the UE receives indication information, which triggers transmission of the signal, in a Msg4 in the random access process; the UE receives indication information, which triggers transmission of the signal, in downlink control information, wherein the downlink control information is carried in a downlink control channel which is transmitted in a UE-dedicated search space of the downlink control channel; the UE receives indication information, which triggers transmission of the signal, in downlink control information, wherein the downlink control information is carried in a downlink control channel which is transmitted in a search space of the downlink control channel configured for the UE.

In at least one exemplary implementation of the embodiment, the update time of timing advance is periodically configured. The period length is configured by the base station or by default.

In at least one exemplary implementation of the embodiment, the reference time of the update time of the first timing advance is configured by the base station or configured by default. In addition, the default configuration of the reference time of the update time of the first timing advance is the time when the UE switches from the RRC-CONNECT state to the RRC-IDLE state.

In at least one exemplary implementation of the embodiment, after the UE receives the update information of the timing advance from the base station, the timer for timing advance update is reset.

In at least one exemplary implementation of the embodiment, when the UE transmits the signal on the one or more first uplink channel resources, one of the following conditions needs to be met: in a period of time, among F1 uplink data transmissions performed by the UE on the first type of second uplink channel resource, the number of times of retransmissions needed for realizing successful uplink data transmission is greater than or equal to G1, wherein F1 and G1 are positive integers, and F1 is greater than G1; among F2 consecutive uplink data transmissions performed by the UE on the first type of second uplink channel resource, the number of times of retransmissions needed for realizing successful uplink data transmission is greater than or equal to G2, wherein F2 and G2 are positive integers, and F2 is greater than G2; or in one uplink data transmission performed by the UE on the first type of second uplink channel resource, the number of times of retransmission is not less than G3, wherein G3 is a positive integer.

In at least one exemplary implementation of the embodiment, the number of times of retransmissions needed for realizing successful uplink data transmission refers to the number of times of retransmission needed to be carried out in order to achieve successful uplink data transmission.

In at least one exemplary implementation of the embodiment, when the UE transmits the signal on the one or more first uplink channel resources, one of the following conditions needs to be met: after performing uplink data transmission on the first type of second uplink channel resource, the UE fails to detect indication information, which indicates successful uplink data transmission, sent by the base station; after performing uplink data transmission on the first type of second uplink channel resource, the UE fails to detect resource scheduling information, which indicates to conduct retransmission for the uplink data transmission, sent by the base station; or after performing uplink data transmission on the first type of second uplink channel resource, the UE detects a downlink control channel in a corresponding search space of the downlink control channel.

In at least one exemplary implementation of the embodiment, in a case where the UE detects the downlink control channel in the search space of the downlink control channel, downlink control information carried in the downlink control channel includes one of the following: indication information of timing advance invalidation; indication information of timing advance update; and indication information used for transmitting the signal.

In at least one exemplary implementation of the embodiment, the one or more first uplink channel resources used for transmitting the signal include: one or more first uplink channel resources in a time domain position after a moment when one or more conditions that need to be satisfied are satisfied.

FIG. 12 is a schematic diagram of transmission of uplink data resources according to the embodiment of the present disclosure. As shown in FIG. 12, the base station configures, through the first configuration information, resources for transmitting uplink data for the UE 1, wherein the resources includes multiple uplink data resources which are respectively numbered as an uplink data resource 1, an uplink data resource 2, an uplink data resource 3, an uplink data resource 4 and the like. The uplink data resources are used by the UE 1 for transmitting data in the RRC-IDLE state.

The base station configures the positions of the random access channel resources in the system information. Multiple random access channel resources are included and are respectively numbered as a random access channel resource 1, a random access channel resource 2, a random access channel resource 3, a random access channel resource 4, a random access channel resource 5, a random access channel resource 6, a random access channel resources 7, and the like.

In the embodiment, when the timer for timing advance update expires, the UE needs to transmit a non-contention-based random access signal on a dedicated random access resource so that the base station can detect the timing advance based on the non-contention-based random access signal. The initial time of the timer for timing advance update is the time when the UE switches from the RRC-CONNECT state to the RRC-IDLE state, that is, the "initial time" in FIG. 12. When the timer for timing advance update expires ("expiration time" in FIG. 12), the UE 1 needs to transmit a non-contention-based random access signal on the next dedicated random access resource. In the embodiment, the next dedicated random access resource is the third dedicated random access resource, that is, the random access channel resource 5 in FIG. 12.

In at least one exemplary implementation of the embodiment, after the base station completes the detection of the timing advance, the base station sends the update result of the timing advance to the UE, and at the moment, the timer for the timing advance update is reset.

Through the above operations, the problem of excessively high power consumption of the UE in a process of data transmission in a non RRC-CONNECT state in the related technology is solved, and the effect of reducing the transmission power consumption of the UE in the data transmission process is achieved.

Through the description of the above implementations, those having ordinary skill in the art can understand that the method according to the above embodiment may be implemented by means of software plus a necessary general hardware platform, and of course, may also be implemented through hardware, but in many cases, the former is a better implementation. Based on such understanding, the essence of technical solution of the embodiments of the present disclosure, or in other words, the part of the technical solutions making contributions to the conventional art, may be embodied in the form of a software product stored in a storage medium (such as a Read-Only Memory (ROM)/Random Access Memory (RAM), a magnetic disk and an optical disc), including a number of instructions for enabling a terminal device (which may be a mobile phone, a computer, a server, or a network device, etc.) to perform the methods described in various embodiments of the present disclosure.

Embodiment II

The embodiment of the present disclosure provides a resource determination method, which is described from the perspective of a base station compared with the method described from the perspective of a UE in the above embodiment and example implementations. What has been described will not be repeated.

FIG. 13 is a flowchart of the resource determination method according to the embodiment of the present disclosure. As shown in FIG. 13, the process includes the following operation S1302.

At 1302, a base station sends configuration information of a first uplink channel for acquiring a position of one or more first uplink channel resources to a UE, wherein the one or more first uplink channel resources are used by the UE for transmitting a signal, and the signal includes one of the following: a single subcarrier signal, a multi-subcarrier signal, or a random access signal.

In at least one exemplary implementation of the embodiment, the one or more first uplink channel resources are located in the one or more second uplink channel resources. The one or more second uplink channel resources include at least one of the following: a first type of second uplink channel resource which is a resource configured by the base station through first configuration information and used for indicating the UE to perform uplink data transmission; a second type of second uplink channel resource which is a time domain-frequency domain resource configured for the UE by the base station and used for performing non-contention-based random access to a channel; and a third type of second uplink channel resource which is a time domain-frequency domain resource configured by the base station and used for a random access channel.

Through the description of the above implementations, those having ordinary skill in the art can understand that the method according to the above embodiment may be implemented by means of software plus a necessary general hardware platform, and of course, may also be implemented through hardware, but in many cases, the former is a better implementation. Based on such understanding, the essence of technical solution of the embodiments of the present disclosure, or in other words, the part of the technical solutions making contributions to the conventional art, may be embodied in the form of a software product stored in a storage medium (such as a Read-Only Memory (ROM)/Random Access Memory (RAM), a magnetic disk and an optical disc), including a number of instructions for enabling a terminal device (which may be a mobile phone, a computer, a server, or a network device, etc.) to perform the methods described in various embodiments of the present disclosure.

Embodiment III

The embodiment of the present disclosure provides a data transmission device, which is used for implementing the above embodiments and example implementations. What have been described will not be repeated. As used below; the term "module" may implement a combination of software and/or hardware of a predetermined function. Although the apparatus described in the following embodiments is preferably implemented in software, the implementation in hardware or a combination of software and hardware is also possible and contemplated.

Figure 14:
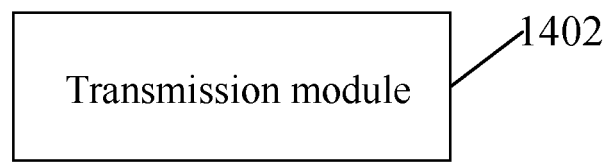
FIG. 14 is a structural diagram of a data transmission device according to the embodiment of the present disclosure.

FIG. 14 is a structural diagram of the data transmission device according to the embodiment of the present disclosure. As shown in FIG. 14, the device includes: a transmission module 1402, configured to transmit a signal on one or more first uplink channel resources, wherein the signal includes one of the following: a single subcarrier signal, a multi-subcarrier signal, or a random access signal.

Embodiment IV

The embodiment of the present disclosure provides a resource determination device, which is used for implementing the above embodiments and example implementations. What have been described will not be repeated. As used below; the term "module" may implement a combination of software and/or hardware of a predetermined function. Although the apparatus described in the following embodiments is preferably implemented in software, the implementation in hardware or a combination of software and hardware is also possible and contemplated.

Figure 15:
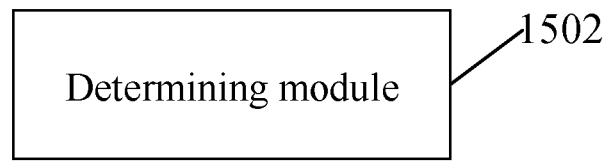
FIG. 15 is a structural diagram of a resource determination device according to the embodiment of the present disclosure.

FIG. 15 is a structural diagram of the resource determination device according to the embodiment of the present disclosure. As shown in FIG. 15, the device includes: a determining module 1502, configured to transmit configuration information of a first uplink channel for acquiring a position of one or more first uplink channel resources to the UE, wherein the one or more first uplink channel resources are used by the UE for transmitting a signal, and the signal includes one of the following: a single subcarrier signal, a multi-subcarrier signal, or a random access signal.

Embodiment V

The embodiment of the present disclosure provides a storage medium, in which a computer program is stored. The computer program is configured to execute the operations in any one of the above method embodiments at runtime.

In at least one exemplary implementation of the embodiment, the above storage medium may be configured to store the computer program for performing the following operations: operation 1. a UE transmits a signal on one or more first uplink channel resources, wherein the signal includes one of the following: a single subcarrier signal, a multi-subcarrier signal, or a random access signal.

In at least one exemplary implementation of the embodiment, the above storage medium may alternatively be configured to store the computer program for performing the following operation: operation 2, a base station sends configuration information of a first uplink channel for acquiring a position of one or more first uplink channel resources to the UE, wherein the one or more first uplink channel resources are used by the UE to transmit a signal, and the signal includes one of the following: a single subcarrier signal, a multi-subcarrier signal, or a random access signal.

In at least one exemplary implementation of the embodiment, the above storage medium may include, but is not limited to: a U disk, a read-only memory (ROM for short), a random access memory (RAM for short), and various media capable of storing the computer programs, such as mobile hard disks, magnetic disks, or optical disks.

Embodiment VI

The embodiment of the present disclosure provides an electronic device, which includes a memory and a processor. A computer program is stored in the memory, and the processor is configured to run the computer program so as to execute the operations in any one of the above method embodiments at runtime.

In at least one exemplary implementation of the embodiment, the above electronic device may further include transmission equipment and input/output equipment, wherein the transmission equipment is connected to the above processor; and the input/output equipment is connected to the above processor.

In at least one exemplary implementation of the embodiment, the above processor may be configured to execute the following operation through the computer program: a UE transmits a signal on one or more first uplink channel resources, wherein the one or more first uplink channel resources are located in the one or more second uplink channel resources, and the signal includes one of the following: a single subcarrier signal, a multi-subcarrier signal, or a random access signal.

In at least one exemplary implementation of the embodiment, the above processor may also be configured to execute the following operations through the computer program: a base station sends configuration information of a first uplink channel for acquiring a position of one or more first uplink channel resources to a UE, wherein the one or more first uplink channel resources are used by the UE for transmitting a signal, and the signal includes one of the following: a single subcarrier signal, a multi-subcarrier signal, or a random access signal.

For specific examples in the embodiment, reference may be made to the examples described in the above embodiments and exemplary implementations, and details are not described herein again in the embodiment.

It is apparent that a person skilled in the art shall understand that all of the above-mentioned modules or operations in the present disclosure may be implemented by using a general computation apparatus, may be centralized on a single computation apparatus or may be distributed on a network composed of multiple computation apparatuses. Optionally, they may be implemented by using executable program codes of the computation apparatuses. Thus, they may be stored in a storage apparatus and executed by the computation apparatuses, the shown or described operations may be executed in a sequence different from this sequence under certain conditions, or they are manufactured into each integrated circuit module respectively, or multiple modules or operations therein are manufactured into a single integrated circuit module. Thus, the embodiments of the present disclosure are not limited to any specific hardware and software combination.

The above is only the exemplary embodiments of the present disclosure, not intended to limit the present disclosure. As will occur to those having ordinary skill in the art, the present disclosure is susceptible to various modifications and changes. Any modifications, equivalent replacements, improvements and the like made within the principle of the present disclosure shall fall within the scope of protection of the present disclosure.

What is claimed is:

1. A data transmission method, comprising:
   transmitting, by user equipment (UE), a signal on one or more first uplink channel resources;
   wherein the signal comprises a multi-subcarrier signal;
   wherein the multi-subcarrier signal further comprises: transmitting multiple multi-subcarrier signals on the one or more first uplink channel resources, wherein a frequency domain bandwidth occupied by the multi-subcarrier signal is less than or equal to a frequency domain bandwidth corresponding to the one or more first uplink channel resources; the multiple multi-subcarrier signals transmitted on the one or more first uplink channel resources are the same or different, wherein the multiple multi-subcarrier signals being different is embodied in following aspect: numbers of OFDM symbols occupied by the multiple multi-subcarrier signals are different;
   wherein the one or more first uplink channel resources are located in one or more second uplink channel resources, comprising following manner: M second uplink channel resources in N second uplink channel resources serve as the one or more first uplink channel resources, wherein N and M are positive integers;
   for different sets of the N second uplink channel resources, corresponding values of number M of second uplink channel resources selected as the one or more first uplink channel resources being independently configured;
   wherein when the UE transmits the signal on the one or more first uplink channel resources, one of the following conditions needs to be met:
   time for timing advance update arrives, and T is greater than or equal to a preset threshold, wherein T is an interval between an update period time of the timing advance and most recent time of receiving update information of the timing advance from the a station;
   the UE receives indication information, which triggers transmission of the signal, in downlink control information, wherein the downlink control information is carried in a downlink control channel which is transmitted in a UE-dedicated search space of the downlink control channel;
   the UE receives indication information, which triggers transmission of the signal, in downlink control information, wherein the downlink control information is carried in a downlink control channel which is transmitted in a search space of the downlink control channel configured for the UE.

2. The method according to claim 1, wherein the signal further comprises one of the following: a single subcarrier signal, a random access signal; wherein the UE acquires a location of the one or more first uplink channel resources by receiving configuration information of a first uplink channel from the base station.

3. The method according to claim 2, wherein the one or more second uplink channel resources comprise at least one of the following:
   a first type of second uplink channel resource which is a resource configured by the base station through first configuration information and used for indicating the UE to perform uplink data transmission;

a second type of second uplink channel resource which is a time domain-frequency domain resource configured for the UE by the base station and used for performing non-contention-based random access to a channel;
a third type of second uplink channel resource which is a time domain-frequency domain resource configured by the base station and used for a random access channel.

4. The method according to claim 3, wherein the one or more first uplink channel resources are located in the one or more second uplink channel resources, comprising the following manner:
in a time domain interval, Q second uplink channel resources in a second uplink channel resource set serve as the one or more first uplink channel resources, wherein the second uplink channel resource set comprises second uplink channel resources in the time domain interval, and Q is a positive integer.

5. The method according to claim 4, wherein
an initial position of the time domain interval is indicated through signaling or determined according to default configuration;
and/or,
a length of the time domain interval comprises one of the following: a transmission period of the signal; or a configuration period of the first type of second uplink channel resource.

6. The method according to claim 4, wherein the Q second uplink channel resources comprise one of the following:
in the time domain interval, first Q second uplink channel resources in the second uplink channel resource set;
in the time domain interval, last Q second uplink channel resources in the second uplink channel resource set;
in the time domain interval, Q second uplink channel resources selected in the second uplink channel resource set according to a preset order.

7. The method according to claim 1, wherein a sum of a time domain length of the at least one multi-subcarrier signal is equal to a time domain length of the one or more first uplink channel resources.

8. The method according to claim 1, wherein information carried in the signal is predetermined information, wherein the predetermined information comprises at least one of the following: a demodulation dedicated reference signal; a reference signal; and predetermined bit information.

9. The method according to claim 1, wherein when the UE transmits the signal on the one or more first uplink channel resources, one of the following conditions needs to be met:
a timer for timing advance update expires;
time for timing advance update arrives;
saved timing advance becomes invalid;
the UE receives indication information, which triggers transmission of the signal, in a Msg2 in a random access process;
the UE receives indication information, which triggers transmission of the signal, in a Msg4 in the random access process.

10. The method according to claim 3, wherein when the UE transmits the signal on the one or more first uplink channel resources, one of the following conditions needs to be met:
in a period of time, among F1 uplink data transmissions performed by the UE on the first type of second uplink channel resource, a number of times of retransmissions needed for realizing successful uplink data transmission is greater than or equal to G1, wherein F1 and G1 are positive integers, and F1 is greater than G1;
among F2 consecutive uplink data transmissions performed by the UE on the first type of second uplink channel resource, the number of times of retransmissions needed for realizing successful uplink data transmission is greater than or equal to G2, wherein F2 and G2 are positive integers, and F2 is greater than G2; or,
in one uplink data transmission performed by the UE on the first type of second uplink channel resource, the number of times of retransmission is greater than or equal to G3, wherein G3 is a positive integer.

11. The method according to claim 3, wherein when the UE transmits the signal on the one or more first uplink channel resources, one of the following conditions needs to be met:
after performing uplink data transmission on the first type of second uplink channel resource, the UE fails to detect indication information, which indicates successful uplink data transmission, sent by the base station;
after performing uplink data transmission on the first type of second uplink channel resource, the UE fails to detect resource scheduling information, which indicates to conduct retransmission for the uplink data transmission, sent by the base station; or
after performing uplink data transmission on the first type of second uplink channel resource, the UE detects a downlink control channel in a corresponding search space of the downlink control channel.

12. The method according to claim 11, wherein in a case where the UE detects a downlink control channel in the search space of the downlink control channel, downlink control information carried in the downlink control channel comprises one of the following: indication information of timing advance invalidation; indication information of timing advance update; and indication information used for transmitting the signal.

13. The method according to claim 9, wherein the one or more first uplink channel resources used for transmitting the signal comprise: one or more first uplink channel resources in a time domain position after a moment when one or more conditions that need to be satisfied are satisfied.

14. A resource determination method, comprising:
sending, by a base station, configuration information of a first uplink channel for acquiring a position of one or more first uplink channel resources to user equipment (UE), wherein the one or more first uplink channel resources are used by the UE for transmitting a signal, and the signal comprises a multi-subcarrier signal;
wherein the multi-subcarrier signal further comprises: transmitting multiple multi-subcarrier signals on the one or more first uplink channel resources, wherein a frequency domain bandwidth occupied by the multi-subcarrier signal is less than or equal to a frequency domain bandwidth corresponding to the one or more first uplink channel resources; the multiple multi-subcarrier signals transmitted on the one or more first uplink channel resources are the same or different, wherein the multiple multi-subcarrier signals being different is embodied in following aspect: numbers of OFDM symbols occupied by the multiple multi-subcarrier signals are different;
wherein the one or more first uplink channel resources are located in one or more second uplink channel resources, comprising following manner: M second uplink channel resources in N second uplink channel resources serve as the one or more first uplink channel resources, wherein N and M are positive integers;

for different sets of the N second uplink channel resources, corresponding values of number M of second uplink channel resources selected as the one or more first uplink channel resources being independently configured;

wherein when the UE transmits the signal on the one or more first uplink channel resources, one of the following conditions needs to be met:

time for timing advance update arrives, and T is greater than or equal to a preset threshold, wherein T is an interval between an update period time of the timing advance and most recent time of receiving update information of the timing advance from the base station;

the UE receives indication information, which triggers transmission of the signal, in downlink control information, wherein the downlink control information is carried in a downlink control channel which is transmitted in a UE-dedicated search space of the downlink control channel;

the UE receives indication information, which triggers transmission of the signal, in downlink control information, wherein the downlink control information is carried in a downlink control channel which is transmitted in a search space of the downlink control channel configured for the UE.

15. The method according to claim 14, wherein the one or more second uplink channel resources comprise at least one of the following:

a first type of second uplink channel resource which is a resource configured by the base station through first configuration information and used for indicating the UE to perform uplink data transmission;

a second type of second uplink channel resource which is a time domain-frequency domain resource configured for the UE by the base station and used for performing non-contention-based random access to a channel;

a third type of second uplink channel resource which is a time domain-frequency domain resource configured by the base station and used for a random access channel.

16. A data transmission device, located in a user equipment (UE), and comprising a memory storing instructions and a processor in communication with the memory, wherein the processor is configured to executing the instruction to:

transmit a signal on one or more first uplink channel resources, wherein the signal comprises a multi-subcarrier signal;

wherein the multi-subcarrier signal further comprises: transmitting multiple multi-subcarrier signals on the one or more first uplink channel resources, wherein a frequency domain bandwidth occupied by the multi-subcarrier signal is less than or equal to a frequency domain bandwidth corresponding to the one or more first uplink channel resources; the multiple multi-subcarrier signals transmitted on the one or more first uplink channel resources are the same or different, wherein the multiple multi-subcarrier signals being different is embodied in following aspect: numbers of OFDM symbols occupied by the multiple multi-subcarrier signals are different;

wherein the one or more first uplink channel resources are located in one or more second uplink channel resources, comprising following manner: M second uplink channel resources in N second uplink channel resources serve as the one or more first uplink channel resources, wherein N and M are positive integers;

for different sets of the N second uplink channel resources, corresponding values of number M of second uplink channel resources selected as the one or more first uplink channel resources being independently configured;

wherein when the UE transmits the signal on the one or more first uplink channel resources, one of the following conditions needs to be met:

time for timing advance update arrives, and T is greater than or equal to a preset threshold, wherein T is an interval between an update period time of the timing advance and most recent time of receiving update information of the timing advance from a base station;

the UE receives indication information, which triggers transmission of the signal, in downlink control information, wherein the downlink control information is carried in a downlink control channel which is transmitted in a UE-dedicated search space of the downlink control channel;

the UE receives indication information, which triggers transmission of the signal, in downlink control information, wherein the downlink control information is carried in a downlink control channel which is transmitted in a search space of the downlink control channel configured for the UE.

* * * * *